UNITED STATES PATENT OFFICE.

WILLIAM B. McGARVEY, OF ROCHESTER, PENNSYLVANIA, ASSIGNOR OF ONE-HALF TO WALTER A. ROSE, OF SAME PLACE.

COMPOSITION FOR CONVERTING INDIA-RUBBER OR ITS COMPOUNDS INTO HARDENED RUBBER.

SPECIFICATION forming part of Letters Patent No. 383,137, dated May 22, 1888.

Application filed August 29, 1887. Serial No. 248,168. (No specimens.) Patented in Canada July 22, 1887, No. 27,234.

*To all whom it may concern:*

Be it known that I, WILLIAM B. McGARVEY, a citizen of the United States, residing at Rochester, in the county of Beaver and State of Pennsylvania, have invented a new and useful Composition of Matter to be Used in the Converting of India-Rubber or any of its Compounds into Hardened Rubber, (for which I have obtained a patent in Canada, No. 27,234, bearing date July 22, 1887,) of which the following is a specification.

My composition consists of the following ingredients, combined in the proportions stated, viz: oxide of iron, one ounce; petroleum or rock-oil, one pint. These ingredients are then mixed with pure rubber or any of its compounds, using such quantity as the rubber will absorb, and the whole mass fused and pressure applied, producing a hardened rubber; or the ingredients may be applied to the surface of any article made of india-rubber or its compounds, and the same subjected to heat and pressure producing the same results.

By the use of the above composition a very small amount of pure rubber is needed, as any of the compounds containing a small amount of pure rubber may be used. For example, where eighty per cent. of pure rubber is used under existing methods, but ten per cent. is needed with my composition, and a very superior quality of rubber is produced and at a cost of production very much below the present cost. It will also stand a temperature of 400° Fahrenheit.

The proportion of oxide of iron to a given quantity of petroleum may be quite considerably varied in both directions; but I have found that the relative proportions stated in the specification give the most satisfactory results.

What I claim, and desire to secure by Letters Patent of the United States, is—

The herein described composition of matter, consisting of oxide of iron and petroleum or rock-oil, in the proportions specified.

WILLIAM B. McGARVEY.

Witnesses:
J. P. MOORE,
JOHN KASZER.